May 5, 1970

N. P. IVANOV 3,510,701

ROTOR OF A HIGH-SPEED SYNCHRONOUS MACHINE
SUCH AS TURBOGENERATOR
Filed March 3, 1967

United States Patent Office 3,510,701
Patented May 5, 1970

---

3,510,701
ROTOR OF A HIGH-SPEED SYNCHRONOUS MACHINE SUCH AS TURBOGENERATOR
Nikolai Pavlovich Ivanov, Moskovsky prospekt 153, kv. 154, Leningrad, U.S.S.R.
Filed Mar. 3, 1967, Ser. No. 620,452
Int. Cl. H02k 1/32
U.S. Cl. 310—64          4 Claims

ABSTRACT OF THE DISCLOSURE

A rotor of a high-speed synchronous machine, preferably of a turbogenerator, provided with inner-cooled conductors of the exciting winding, in which the exciting winding is made of separate sections distributed along the rotor circumference and laid at least in two rows, the cooling of said exciting winding in each section being effected separately.

---

The present invention relates to a rotor of high-speed synchronous machines such as turbogenerators, and more particularly to exciting windings thereof provided with inner-cooled conductors.

Known in the prior art are rotors of synchronous machines in which exciting windings with inner-cooled conductors are made as concentric coils. In such rotors, even though the delivery and discharge of the coolant, e.g., a liquid, is provided directly to each concentric coil used at present, it is impossible to avoid great pressures in order to achieve the required liquid consumption through the winding, since these coils have a relatively large number of turns, and therefore the sectioning of the concentric coils along the coolant passage for reducing pressures presents significant design and technological difficulties.

There have been made attempts to sectionalize the exciting windings of rotors of high-speed synchronous machines along the coolant passage. However, these attempts failed because the places for the coolant delivery and discharge to exciting windings were almost inaccessible.

An object of the present invention is to increase the effectiveness and to reduce the pressure of the internal-cooling of conductors of exciting windings of high-speed synchronous electric machines, such as turbogenerators.

Another object of the invention is to ensure the reduction in the coolant pressure.

Still another object of the invention is to increase the reliability of the cooling system.

These objects are achieved by an arrangement wherein the exciting winding is designed as a plurality of separate sections subdivided along the rotor circumference and laid at least in two rows, the cooling of conductors of the exciting winding in each section being effected separately. Sections of the exciting winding may be connected in accordance with a loop or wave diagram. Additionally, each half-turn of the section may be provided with an inlet and outlet to ensure the cooling of conductors, or several half-turns in each section may be connected in series along the coolant passage and have an inlet and outlet for the cooling of the conductors.

Figure 2:
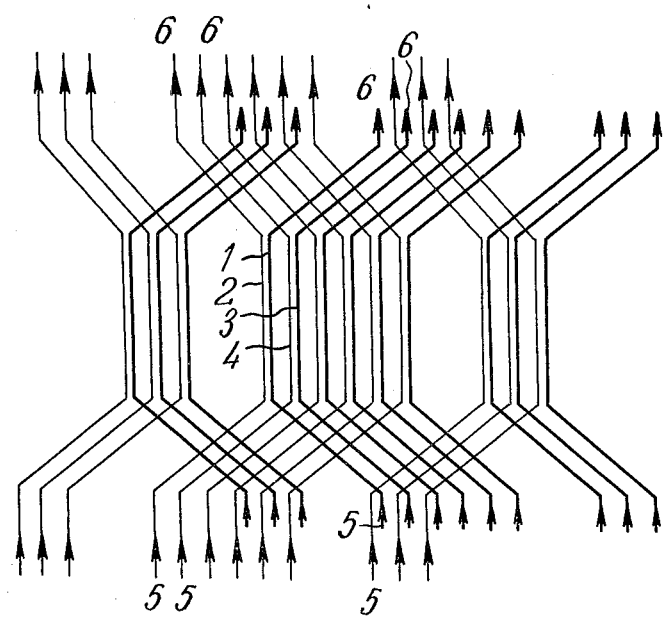
Figure 1:
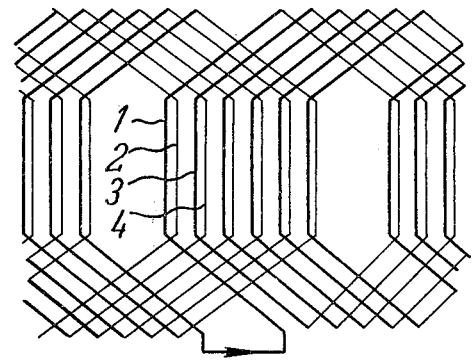

The details of the present invention will become more fully apparent from a consideration of the following description of an exemplary embodiment thereof, taken in conjunction with the accompanying drawing, in which:

FIG. 1 is an embodiment of the connection diagram of the exciting winding of this invention; and FIG. 2 is an embodiment of the diagram of the water flow through the exciting winding shown in FIG. 1.

As can be seen in FIG. 1, the exciting winding of the synchronous machine rotor is made of separate sections 1, 2, 3, 4 subdivided along the rotor circumference. Said sections 1, 2, 3, 4 may be laid in a multilayer winding with the number of layers equal to two, four, six, etc. In the described embodiment the sections 1, 2, 3, 4 are laid in two rows, the odd figures marking sections 1, 3 of the upper row and the even figures marking sections 2, 4 of the lower row.

The sections 1, 2, 3, 4 of the exciting windings may be connected in accordance with the loop or wave diagram (in FIG. 1 the sections are connected in accordance with the loop diagram).

For the better cooling of conductors of the exciting winding, the half-turns of each section have inlets 5 (FIG. 2) and outlets 6 for the coolant, e.g., water; however, any liquid or gas may be used as the coolant.

The inner-cooling of the conductors may be carried into effect in another manner. Thus, for example, the half-turns of the exciting winding in each section may be subdivided into groups of two, three or any other number of turns interconnected in series along the coolant passage and having an inlet and outlet for the coolant in each group.

Such a subdivision of the coolant passage into separate portions having a length of one or a plurality of half-turns permits reducing the pressure of the coolant and increasing the effectiveness of the cooling of the exciting winding.

Additionally, the connection of sections of the exciting winding in accordance with the loop or wave diagram facilitates the access to each joint of the coolant passage both in the process of the manufacturing and in the process of maintenance, thereof, which, in turn, increases the reliability of the cooling system.

The described design of the rotor with the exciting winding subdivided into sections may be primarily used in high-speed powerful synchronous machines, e.g., turbogenerators or other similar machines having the exciting winding with the inner-cooled conductors.

What is claimed is:

1. A multi-layer exciting winding with internally cooled conductors for high-speed synchronous generators, said exciting winding comprising a plurality of separate identical sections with electrically connected conductors, each of said sections having on one side thereof an inlet for a coolant and on the other side thereof an outlet for the coolant to enable separate internal cooling of the conductors.

2. A multi-layer exciting winding as claimed in claim 1, wherein each half-turn of the conductors of the winding has a separate coolant inlet and a separate coolant outlet.

3. A multi-layer exciting winding as claimed in claim 1, wherein the half-turns of the conductors of the winding are combined into groups, each group containing several half-turns, the half-turns of each group being connected in series for passage of the coolant and having a common inlet and common outlet for the coolant.

4. A multilayer exciting winding as claimed in claim 1, wherein said sections are interconnected in a loop or wave winding.

References Cited

UNITED STATES PATENTS

| 2,897,382 | 7/1959 | Hamill | 310—54 |
| 3,185,872 | 5/1965 | Weissheimer | 310—54 |
| 3,243,616 | 3/1966 | Tudge | 310—54 |

MILTON O. HIRSHFIELD, Primary Examiner
R. SKUDY, Assistant Examiner